United States Patent
Gould et al.

(10) Patent No.: US 9,589,311 B2
(45) Date of Patent: Mar. 7, 2017

(54) INDEPENDENT THREAD SATURATION OF GRAPHICS PROCESSING UNITS

(71) Applicant: INTEL CORPORATION, Santa Clara, CA (US)

(72) Inventors: Julia A. Gould, San Jose, CA (US); Haihua Wu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 359 days.

(21) Appl. No.: 14/133,096

(22) Filed: Dec. 18, 2013

(65) Prior Publication Data

US 2015/0170318 A1    Jun. 18, 2015

(51) Int. Cl.
  *G06T 1/20*    (2006.01)
  *G06F 9/50*    (2006.01)

(52) U.S. Cl.
  CPC .............. *G06T 1/20* (2013.01); *G06F 9/5066* (2013.01)

(58) Field of Classification Search
  None
  See application file for complete search history.

(56) References Cited

U.S. PATENT DOCUMENTS

| | | | | |
|---|---|---|---|---|
| 7,111,156 B1 * | 9/2006 | Mang | ................... | G06F 9/3001 712/228 |
| 7,707,578 B1 * | 4/2010 | Zedlewski | ............ | G06F 9/5027 712/215 |
| 8,438,370 B1 * | 5/2013 | Budge | ................... | G06F 9/3879 712/241 |
| 2006/0190945 A1 * | 8/2006 | Kissell | ................. | G06F 9/3851 718/108 |
| 2009/0327662 A1 * | 12/2009 | Jiang | ..................... | G06F 9/3838 712/217 |
| 2010/0122067 A1 * | 5/2010 | Lindholm | ............. | G06F 9/3851 712/205 |
| 2010/0257538 A1 * | 10/2010 | Zhao | ..................... | G06F 9/4881 718/106 |
| 2011/0022817 A1 * | 1/2011 | Gaster | ...................... | G06F 9/52 711/202 |
| 2011/0055479 A1 * | 3/2011 | West | ..................... | G06F 9/4881 711/118 |
| 2011/0194617 A1 * | 8/2011 | Kumar | ............. | H04N 19/00684 375/240.25 |
| 2012/0219068 A1 * | 8/2012 | Rosenzweig | ........ | H04N 19/436 375/240.24 |
| 2013/0086365 A1 * | 4/2013 | Gschwind | ........... | G06F 9/30072 712/220 |

(Continued)

FOREIGN PATENT DOCUMENTS

WO    WO2014171935 A1 * 10/2014

*Primary Examiner* — Ulka Chauhan
*Assistant Examiner* — Patrick F Valdez

(57) ABSTRACT

Techniques to saturate a graphics processing unit (GPU) with independent threads from multiple kernels are described. An apparatus may include a graphics processing unit driver for a graphics processing unit having a first partition including a first plurality of execution units and a second partition including a second plurality of execution units, the graphics processing unit driver to dispatch one or more threads of a first kernel to the first partition and to dispatch one or more threads of a second kernel to the second partition to increase a utilization of the plurality of execution units and avoid hardware resource competition.

19 Claims, 9 Drawing Sheets

(56) References Cited

U.S. PATENT DOCUMENTS

| | | | |
|---|---|---|---|
| 2013/0194286 A1* | 8/2013 | Bourd | G06F 9/544 345/545 |
| 2013/0293546 A1* | 11/2013 | Lee | G06T 1/20 345/426 |
| 2014/0032968 A1* | 1/2014 | Nandam | G06F 11/2221 714/32 |
| 2014/0109102 A1* | 4/2014 | Duncan | G06F 9/3851 718/103 |
| 2014/0208331 A1* | 7/2014 | Li | G06F 9/5044 718/105 |
| 2014/0285500 A1* | 9/2014 | Lindholm | G06T 1/20 345/506 |
| 2016/0173897 A1* | 6/2016 | Wu | H04N 19/865 375/240.29 |

\* cited by examiner

INDEPENDENT THREAD SATURATION OF GRAPHICS PROCESSING UNITS

BACKGROUND

Modern graphics processing units (GPUs) include an array of cores, referred to as execution units (EUs) to process instructions. A set of instructions comprise a kernel. Kernels are dispatched to the GPU in the form of multiple threads. The GPU may process the threads of the kernel (e.g., execute the instructions corresponding to the kernel) using the EUs.

Many kernels, particularly kernels corresponding to encoded display data contain dependencies between threads in the kernel. Said differently, execution of some of the threads in the kernel must wait for the threads from which they depend to be executed before their own execution can be started. As such, only a subset of the total number of threads in a kernel can be executed by a GPU in parallel. The number of threads in each subset that can be executed in parallel may be less than the total number of EUs. As a result, some of the EUs may be idle (e.g., not processing a thread) due to the dependencies between threads and the limitations of the number of threads that can be processed in parallel. As can be appreciated, this may result in an under utilization of the EUs in a GPU and may create a bottleneck in the overall processing pipeline.

Conventionally, a kernel developer may attempt to improve EU utilization by rewriting and merging multiple kernels into a combined kernel. Said differently, the threads in each of the kernels may be combined into a single thread space. As can be appreciated, however, this requires a substantial amount of manual work by the kernel developer. Furthermore, the combined kernel has a much bigger footprint than the separate kernels, resulting in more pressure on the hardware resources (e.g., instruction cache, sampler cache, or the like.) Additionally, manually combining kernels is not viable for complicated and/or large kernels due to the amount of manual effort necessary to merge kernels.

Thus, there is a need for techniques to increase the utilization of EUs in a GPU.

DETAILED DESCRIPTION

Figure 1:
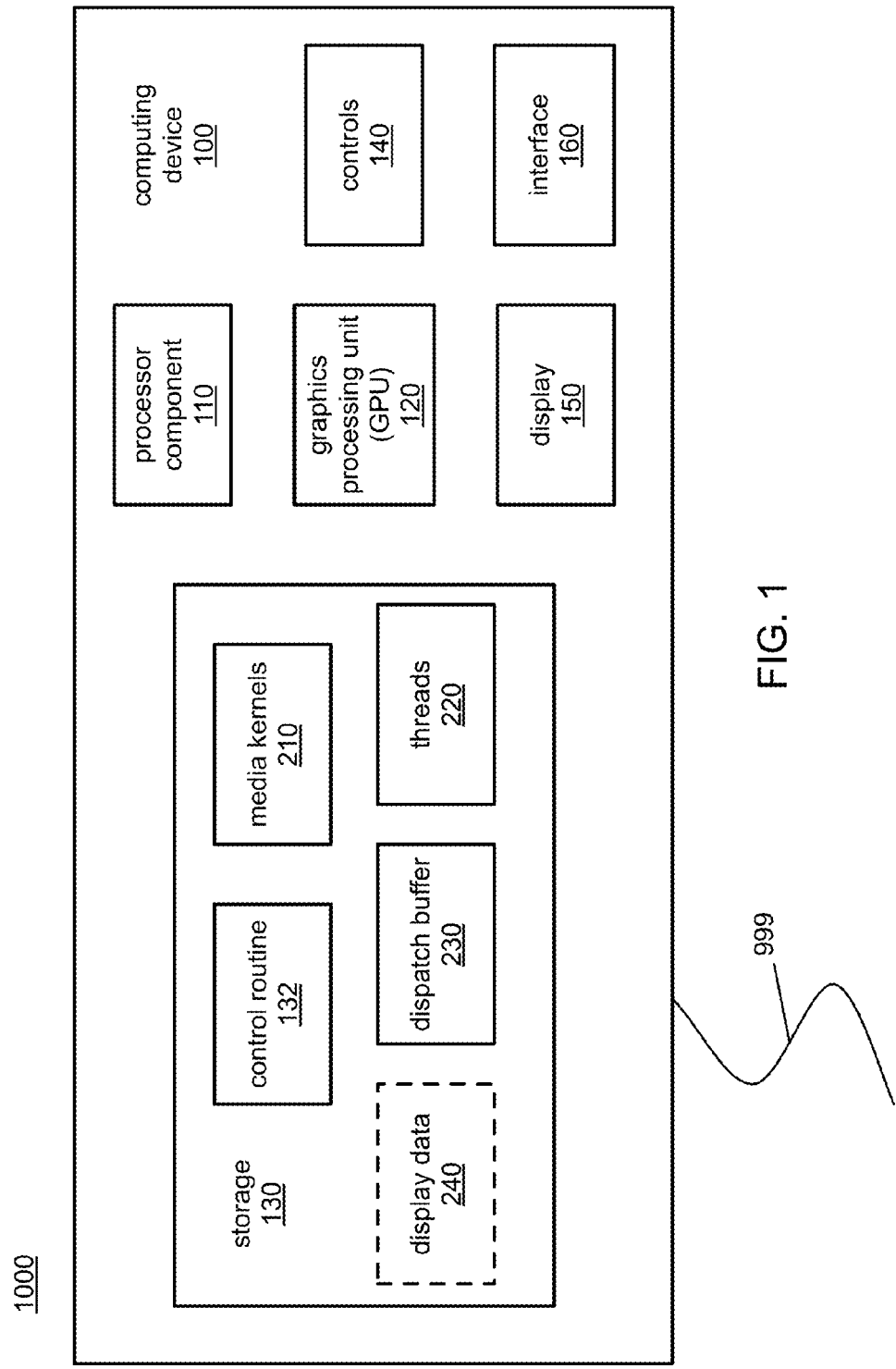
FIG. 1 illustrates an embodiment of a display data processing system.

Various embodiments are generally directed to techniques to saturate a graphics processing unit (GPU) with independent threads from multiple kernels. Said differently, various embodiments are directed to saturating a GPU with threads that do not have dependencies between each other to increase a utilization of the execution units (EUs) in the GPU.

As will be appreciated, GPUs often include a number of EUs to execute multiple threads from a kernel in parallel. However, where the threads in a kernel include dependencies, only a subset of the threads may be executed in parallel as some threads must wait on the execution of other threads prior to starting their own execution. Various embodiments of the present disclosure provide for saturating a GPU with independent threads (e.g., threads which may be concurrently executed) from multiple kernels in order to increase the utilization of the EUs in the GPU. More specifically, various embodiments may simultaneously dispatch independent threads from multiple kernels to different partitions of EUs in a GPU. As such, an increase in utilization of the EUs may be realized. By dispatching threads from multiple kernels to different partitions of EUs inherent hardware resource competition (i.e. instruction cache, sampler cache etc.) that results from the simultaneous execution of multiple kernels on the GPU may be avoided.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a display data processing system 1000 incorporating a computing device 100. The computing device 100 may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing or wearable accessories (e.g., glasses, a watch, etc.,) a computing device integrated into a vehicle (e.g., a car, a bicycle, a wheelchair, etc.), a server, a cluster of servers, a server farm, a station, a wireless station, user equipment, and so forth. Furthermore, the computing device 100 may be any of a variety of types of display devices not traditionally thought of as "computers," including without limitation, a DVD player, a portable video player, a console video game system, a television receiver, a video content streaming device, and so forth. Embodiments are not limited in this context.

As depicted, the computing device 100 may exchange signals with another computer (not shown) conveying display data and/or kernel data through network 999. Additionally, the computing device 100 may exchange other data entirely unrelated to display data with another computing device via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Furthermore, although the network 999 is shown as a wireless network, it may in some examples be a wired network.

It should be noted that although the computing devices 100 is depicted as a single computing device, the features of the computing device 100 may be incorporated into multiple computing devices configured to operate in conjunction with each other.

In various embodiments, the computing device 100 incorporates one or more of a processor component 110, a GPU 120, storage 130, control 140, a display 150, and an interface 160 to couple the computing device 100 to the network 999. As will be explained in greater detail below, the GPU 120 includes a number of execution units (EUs) that are organized into partitions. The storage 130 stores one or more of a control routine 132, media kernels 210, threads 220, a dispatch buffer 230 and/or display data 240.

In the computing device 100, the control routine 132 incorporates a sequence of instructions operative on the processor component 110 in its role as either a main processor component and/or the GPU 120 in its role as a GPU to implement logic to perform various functions. In executing the control routine 132, the processor component 110 generates or receives (e.g., via the network 999) the media kernels 210.

It is to be appreciated, that the media kernels 210 may correspond to a variety of different types of data to be processed by the GPU 120. For example, the media kernels 210 may correspond to instructions to be processed by the GPU 120 in order to decode display data. More specifically, the media kernels 210 may correspond to instructions to decode encoded video data (e.g., WMV, VC1, MPEG-2, MPEG-4, H.264, HEVC, VP8, VP9, or the like) for displaying on the display 150 or another display (e.g., on another device, or the like). As such, the control routine 132 may implement a variety of techniques for receiving display data.

As will be explained in greater detail below, the kernels 210 correspond to two or more kernels. Each of these kernels includes a plurality of threads 220. The threads 220 may correspond to instructions to be executed by the EUs of the GPU 120. Furthermore, as will be explained in greater detail below, the threads 220 of a particular kernel 210 may have dependencies with other threads 220 of the same kernel 210.

In executing the control routine 132, the processor component 110 and/or the GPU 120 generates a dispatch buffer 230 based on the threads 220, their dependencies, and/or the number of EUs in the GPU 120 and/or the partitioning of the EUs in the GPU 120. In general, the dispatch buffer is generated by interleaving threads 220 from multiple kernels 210 to form a buffer including indications of a number of independent threads that may be processed by the GPU 120 in parallel to increase a utilization of the EUs of the GPU 120. Said differently, threads 220 are organized into the dispatch buffer 230 so that groups of threads from multiple kernels not having dependencies upon each other may be executed in parallel to increase utilization of the EUs of the GPU 120.

Furthermore, in executing the control routine 132, the processor component 110 and/or the GPU 120 may dispatch the kernels to partitions (e.g., groups of EUs) in the GPU for processing based on the order of the threads 220 in the dispatch buffer 230. As will be appreciated, multiple kernels 210 may be dispatched to the GPU 120 simultaneously. For example, a first one of the kernels 210 may be dispatched to a first partition of EUs of the GPU 120 and a second one of the kernel 210 may be dispatched to a second partition of EUs of the GPU 120 for processing concurrently to increase a utilization of the EUs in the GPU 120. Said differently selected threads 220 from the first one of the kernels 210 and selected threads 220 from the second one of the kernels 210 may be concurrently (e.g., simultaneously, within a predetermined amount of time, in conjunction with, or the like) dispatched to the GPU 120 for processing in parallel.

Additionally, in executing the control routine 132, the processor component 110 and/or the GPU 120 may receive display data 240. For example, display data 240 may be received from another computing device, from another component of the computing device 100, or the like. The kernels 210 may then be dispatched as described above in order to decode the display data. It is to be appreciated, that a variety of techniques for receiving display data may be implemented by the control routine 132.

In various embodiments, the processor component 110 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the GPU 120 may include any of a wide variety of commercially available graphics processing units. Further, one or more of these graphics processing units may have dedicated memory, multiple-threaded processing and/or some other parallel processing capability.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the controls 140 may include any of a variety of controls (e.g., hardware, software, hardware and software, or the like) for providing input or receiving output from the computing device 100.

In various embodiments, the display 150 may be based on any of a variety of displays (e.g., Plasma, LCD, LED, OLED, or the like) for displaying images.

In various embodiments, the interface 160 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
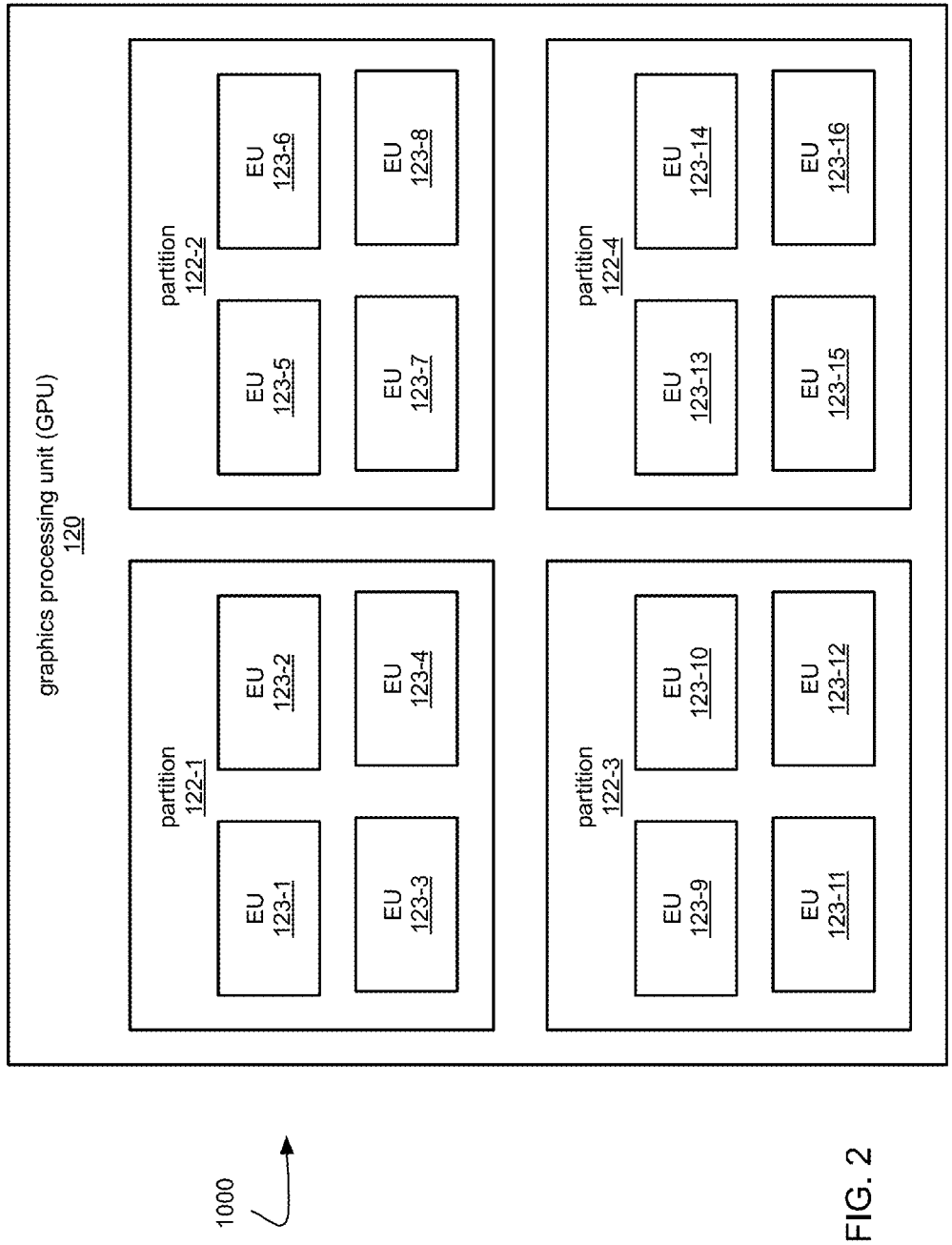
FIG. 2 illustrates an example of a GPU according to an embodiment.

FIG. 2 is a block diagram of a portion of an embodiment of the display data processing system 1000 of FIG. 1. In particular, FIG. 2 depicts an embodiment of the GPU 120. As depicted, the GPU 120 may include a number of EUs 123-1 to 123-16. The EUs 123 are organized into partitions 122-1 to 122-4. For example, the partition 122-1 is depicted including EUs 123-1 to 123-4, the partition 122-2 is depicted including EUs 123-5 to 123-8, the partition 122-3 is depicted including EUs 123-9 to 123-12 and the partition 122-4 is depicted including EUs 123-13 to 123-16.

It is to be appreciated, that the number of partitions 122 and EUs 123 are shown at a quantity to facilitate understanding. The GPU 120 may be implemented with more or less partitions 122 and EUs 123 than shown. Examples are not limited in this context. Additionally, with some examples, the EUs 123 may be physical hardware units configured to execute instructions (e.g., threads) as described herein. In some examples, the EUs 123 may be virtual hardware units configured to execute instructions (e.g., threads) as described herein. Examples are not limited in this context.

Figure 3:
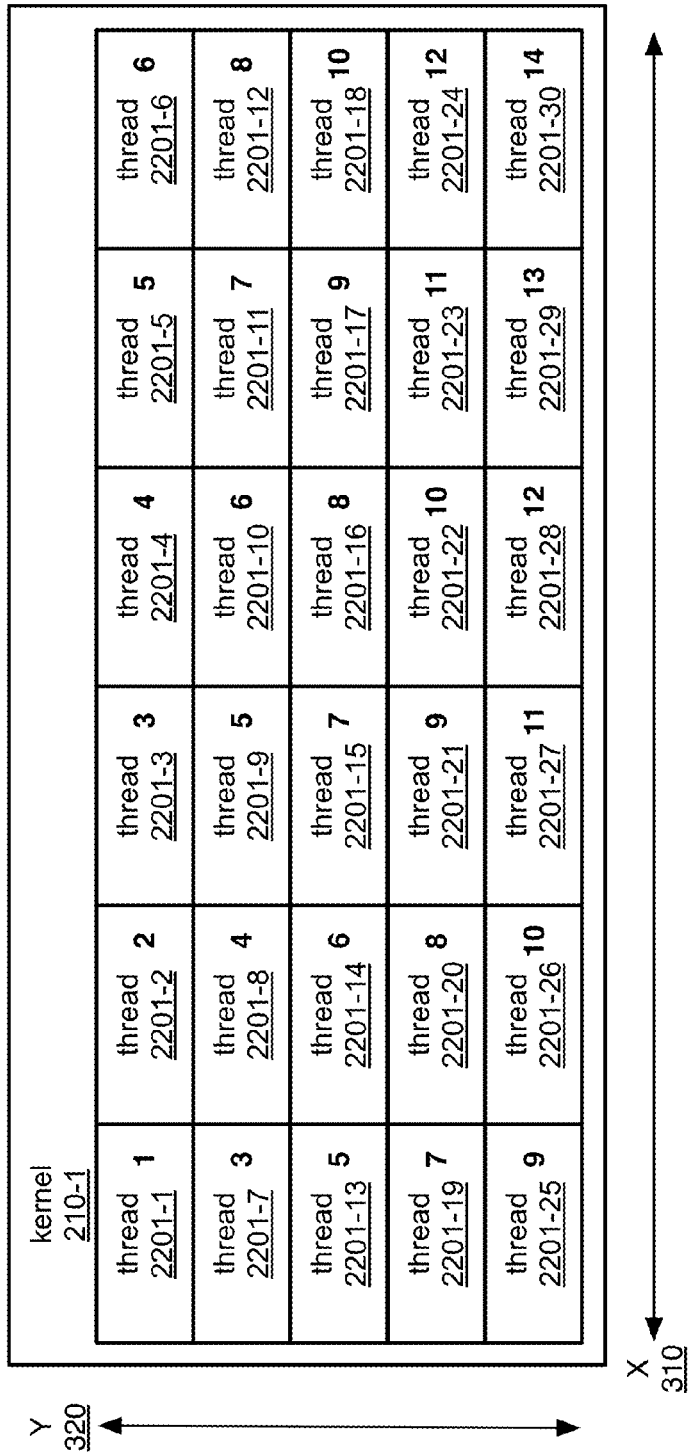
FIGS. 3-4 each illustrate an example of a kernel according to an embodiment.
Figure 4:
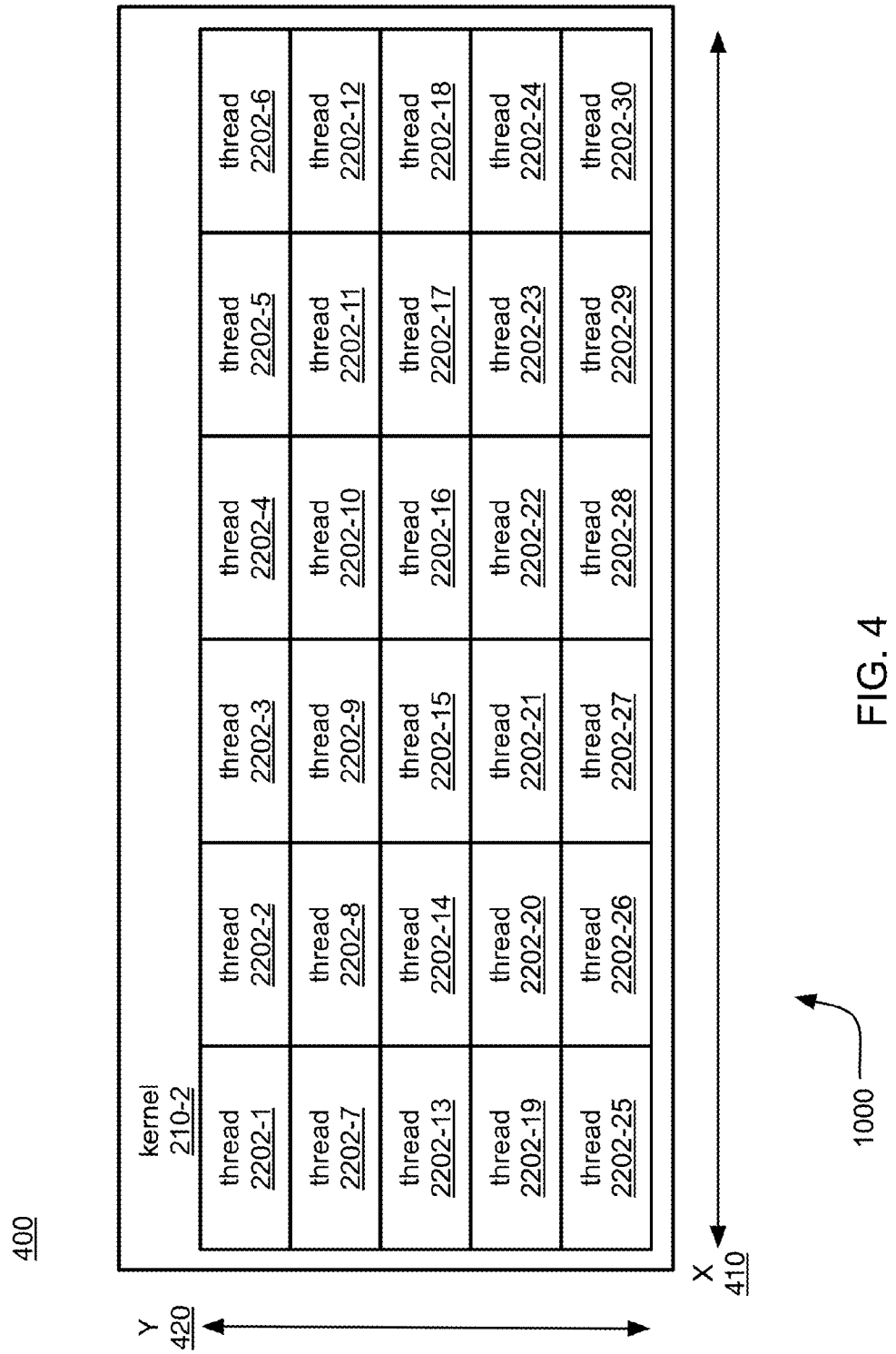

FIGS. 3-4 are block diagrams of portions of embodiments of the display data processing system 1000 of FIG. 1. In particular, each of FIGS. 3-4 depicts an embodiment of one of the kernels 210. As introduced above, the kernels 210 include or correspond to at least two kernels to be processed by the GPU 120. Each of these kernels includes a number of threads to be executed by the EUs 123 of the GPU 120. To facilitate the description of the various examples provided herein, FIG. 3 depicts a first kernel 210-1 and threads 2201 of the first kernel 210-1 while FIG. 4 depicts a second kernel 210-2 and threads 2202 of the second kernel 210-2. It is to be appreciated, that the number of kernels 210 and the number of threads 2201 and 2202 are shown at a quantity to facilitate understanding. In practice, the kernels 210 may include more or less threads 220 than depicted. More specifically, the kernel 210-1 may include more or less threads 2201 than shown. Additionally, the kernel 210-2 may include more or less threads 2202 than shown. Embodiments are not limited in this context.

Turning more specifically to FIG. 3, the first kernel 210-1 is shown including threads 2201-1 to 2201-30. As will be appreciated, threads (e.g., 2201) in a kernel (e.g., 210-1) correspond to a thread space. FIG. 3 depicts a thread space 300 for the kernel 210-1. As can be seen, the threads 2201-1 to 2201-30 are organized into a grid defined by X-axis 310 and a Y-axis 320. Said differently, the threads 2201-1 to 2201-30 of the kernel 210-1 are depicted having spatial relationships between other threads of the kernel 210-1, which can be defined by the (X, Y) coordinates of each thread. Often thread dependencies are defined by the relative distance (e.g., deltaX, deltaY) between the coordinates of the threads in the thread space.

For example, a common dependency pattern is referred to as "wavefront 26." In a wavefront 26 pattern each thread has four dependencies. The dependencies are specified in terms of their coordinate system. In particular, each thread 2201 depends on the threads 2201 whose relative coordinate are (−1,0), (−1, −1), (0,−1) and (1,−1). Said differently, each thread 2201 has a dependency with the threads 2201 directly to its left, to its upper left, directly above, and to its upper right. As will be appreciated, this results in "waves" of threads 2201 that may be concurrently executed.

For example, the thread 2201-2 depends on the thread 2201-1, which must be executed before the thread 2201-2 can be executed. As another example, the thread 2201-8 depends upon the threads 2201-7, 2201-1, 2201-2, and 2201-3, which threads must be executed before the thread 2201-8 can be executed.

In order to facilitate discussion, the threads 2201 are depicted in the thread space 300 showing an order of execution (e.g., bold number next to thread). It is important to note, that this order of execution is based on the thread dependency example (e.g., wavefront 26) described above. It is further to be appreciated, that other thread dependency patterns may be implemented. For example, the dependency pattern implemented may depend upon the encoding standard. Examples are not limited in this context.

As will be appreciated, even with this simple example of the kernel 210-1 having 30 threads (e.g., 2201-1 to 2201-30,) only three threads 2201 can be executed in parallel due to the thread dependencies. As such, if the GPU 120 were to execute the kernel 210-1 using conventional techniques, there would be a substantial amount of EUs 123 sitting idle.

Turning more specifically to FIG. 4, the second kernel 210-2 is shown including threads 2202-1 to 2202-30 arranged in a thread space 400. However, for the examples presented herein, it will be assumed that the threads 2201-1 to 2202-30 of the kernel 210-2 do not have dependencies upon each other. As such, each thread 2202 may be executed concurrently with the other threads 2202. Accordingly, all of the threads 2202-1 to 2202-30 may be executed in parallel.

It is to be appreciated, that although only the first kernel 210-1 is depicted as having dependencies, that both kernels might include dependencies. Examples are not limited in this context.

Figure 5:
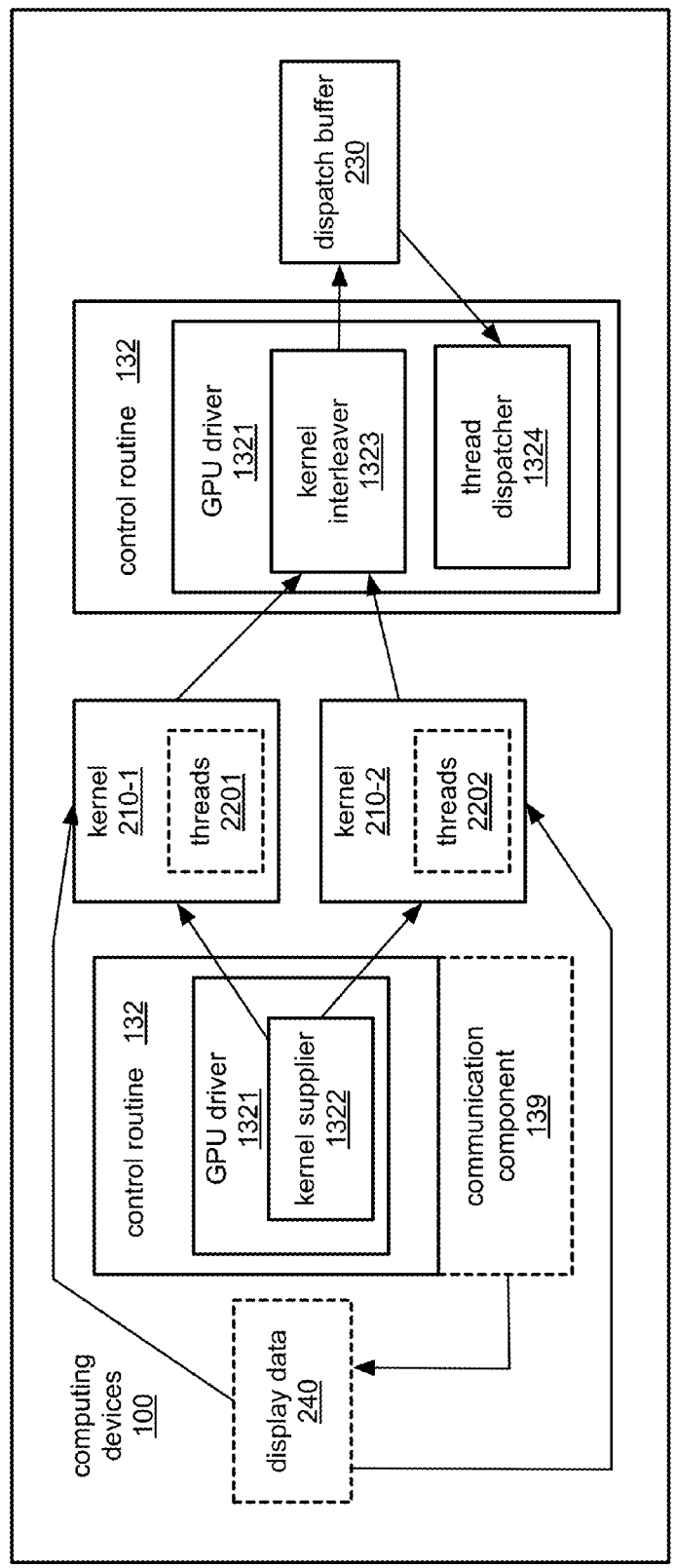
FIG. 5 illustrates an example of a portion of the display data processing system of FIG. 1.

FIG. 5 is a simplified block diagram of a portion of an embodiment of the display data processing system 1000 of FIG. 1. This figure depicts aspects of the operation of interleaving kernels together to saturate a GPU with independent threads. Said differently, this figure depicts aspects of the operations of generating a dispatch buffer where threads from multiple kernels are interleaved, and dispatching the threads from the dispatch buffer such that the GPU is saturated with independent threads for execution to increase a utilization of the EUs of the GPU.

In various embodiments, the control routine 132 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or GPU 120. Where one or more device drivers are included, those device drivers may provide support for any of a variety of other components, whether hardware or software components, of the computer system 100.

The control routine 132 may include or be otherwise linked to communication component 139 executable by the processor component 110 to operate the interface 160 to transmit and receive signals via the network 999 as has been described. Among the signals received may be signals conveying the display data 240. As familiar to those skilled in the art the communications component is selected to be operable with whatever type of interface technology is selected to implement corresponding interface 160.

Turning more specifically to FIG. 5, a GPU driver 1321 of the control routine 132 includes a kernel supplier 1322, a kernel interleaver 1323, and a thread dispatcher 1324. It is to be appreciated that the computing device 100 may receive the display data from any of a variety of sources (e.g., the storage 130, another storage that is not shown, another computing device that is also not shown but that is connected to the computing device 100 over the network 999 or another network.) Furthermore, in some examples, the computing device 100 may not receive display data 240, but may instead receive the kernels 210. Examples are not limited in this context.

In general, the GPU driver 1321 may dispatch one or more threads of a first kernel to a first partition of a first plurality of execution units of a GPU and dispatch one or more threads of a second kernel to a second partition of a second plurality of execution units of the GPU to increase a utilization of the plurality of execution units. For example, the GPU driver 1321 may dispatch threads 2201 from the first kernel 210-1 and threads 2202 from the second kernel 210-2 to partitions 122 of the GPU 120 to increase a utilization of the plurality of EUs 123 in the GPU 120.

The kernel supplier 1322 may supply the first kernel and the second kernel to the kernel interleaver 1323 for interleaving as described herein. In some examples, the kernel supplier 1322 retrieves the kernels 210 from a storage location (e.g., storage 130) or the like. With some examples, the kernel supplier 1322 receives the kernels 210 from a network (e.g., the network 999.) As depicted, the kernel supplier 1322 supplies the kernels 210-1 and 210-2. In some examples, the kernels 210-1 and 210-2 may be media kernels. Said differently, the kernels 210-1 and 210-2 may include threads configured to be executed by a GPU to decode encoded display data. In particularly illustrative examples, the kernels 210 may be used to decode the display data 240. With some examples, the kernel 210-1 may be used to decode the luma information of the display data 240 and the second kernel 210-2 may be used to decode the chrominance information for the display data 240.

The kernel interleaver 1323 may interleave a plurality of threads of the first kernel and a plurality of threads of the second kernel into a dispatch buffer, the dispatch buffer to include an indication of an ordering of execution of the plurality of threads of the first kernel and the plurality of threads of the second kernel. For example, the kernel interleaver 1323 may interleave the threads 2201 and the threads 2202 into the dispatch buffer 230.

The thread dispatcher 1324 may dispatch the first kernel and dispatch the second kernel to the GPU. More specifically, the thread dispatcher may dispatch the first kernel and the second kernel to the GPU based at least in part on the dispatch buffer. For example, the thread dispatcher 1324 may dispatch the threads 2201 of the kernel 210-1 and the threads 2202 of the kernel 210-2 to the GPU 120 based on the dispatch buffer.

It is to be appreciated, that the example provided above in conjunction with FIG. 5 lists only two kernels (e.g., 210-1 and 210-2) while some implementations may interleave more than two kernels. For example, a first kernel may be interleaved with a second kernel (e.g., 210-1 with 210-2) as described above. Furthermore, a third kernel (not shown) may additionally be interleaved with the first kernel. As will be appreciated, some kernels due to the dependency may take significantly longer to process than kernels with out dependency. As such, in order to increase utilization of the EUs 123 as described herein, more than two kernels may be interleaved together.

Figure 6:
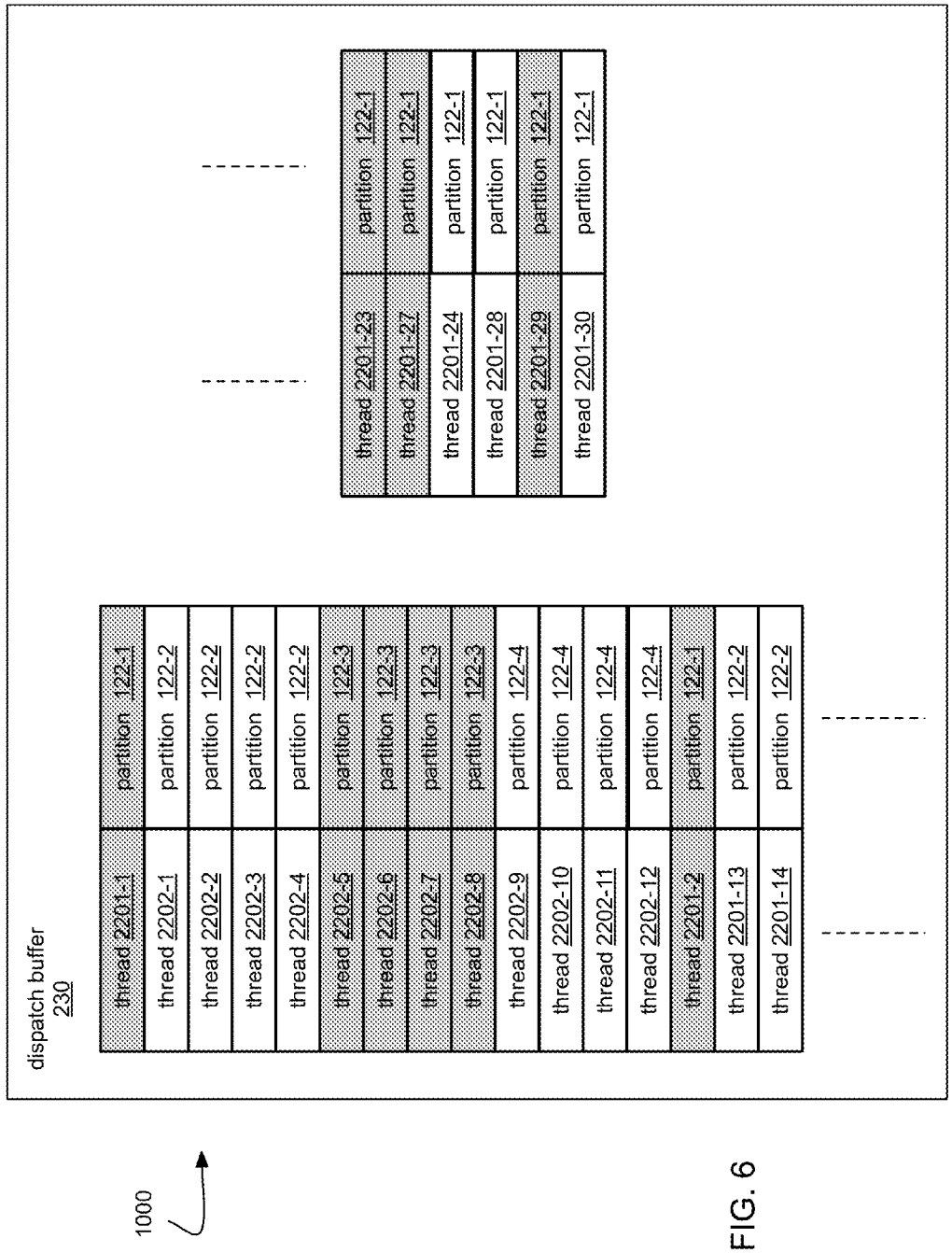
FIG. 6 illustrates an example of a dispatch buffer according to an embodiment.

FIG. 6 is a block diagram of a portion of an embodiment of the display data processing system 1000 of FIG. 1. In particular, this figure illustrates an example dispatch buffer 230. It is to be appreciated, that not all of the threads 2201 or 2202 are represented in the dispatch buffer 230 are shown in this figure for purposes of clarity. However, during practice, a dispatch buffer may include all threads from the kernels to be processed.

In general, the dispatch buffer 230 includes indications of an order of execution (e.g., dispatching) the threads to the GPU. Additionally, the dispatch buffer 230 may include an indication of which partition the threads are to be dispatched to. It is to be appreciated, that the dispatch buffer shown in this figure indicates an example order or execution for the threads 2201 and 2202 based on the above exemplary dependency patterns illustrated in conjunction with FIGS. 3-4. However, other dependency patterns may be implemented, which may change the execution order. Furthermore, the number of EUs in the GPU as well as the number of partitions may change the execution order. In some examples, the order of interleaving the plurality of threads of the first kernel and the plurality of threads of the second kernel may be based at least in part on one or more of the number of the plurality of threads of the first kernel, the number of the plurality of threads of the second, the number of the first plurality of execution units, or the number the second plurality of execution units. Additionally, with some examples, the order of interleaving the plurality of threads of the first kernel and the plurality of threads of the second kernel may be based at least in part on a dependency between the plurality of threads in the first kernel.

Turning more specifically to FIG. 6, some of the threads 2201 and 2202 are depicted, interleaved into the dispatch buffer 230. For example, the thread 2201-1 is shown, followed by the threads 2202-1 to 2202-12, followed by the thread 2201-2, etc. Additionally, each the dispatch buffer 230 includes an indication of which partition 122 of the GPU 120 the thread is to be dispatched to. For example, for the thread 2202-1, an indication points to the partition 122-1. As will be appreciated, due to the dependency between threads 2201, less of the threads 2201 may be executed in parallel than the threads 2202. As such, the dispatch buffer 230 may indicate more of the threads 2202 are to be dispatched sooner than the threads 2201 to increase a utilization of the EUs 123 in the GPU 120. For example, using the example dispatch buffer 230 in this figure, initially, the threads 2201-1 and 2202-1 to 2202-12 may be dispatched (e.g., to the partition 122-1, 122-2, 122-3, and 122-4.) As such only three of the EUs 123 may be idle in this figure cycle of the GPU 120 processing threads. Accordingly, the utilization of the EUs 123 may be increased.

It is to be appreciated, that a variety of different techniques and/or methods for dispatching threads to a GPU exist. The particular technique and/or method may depend upon the GPU, the GPU driver, and/or the kernel.

Figure 7:
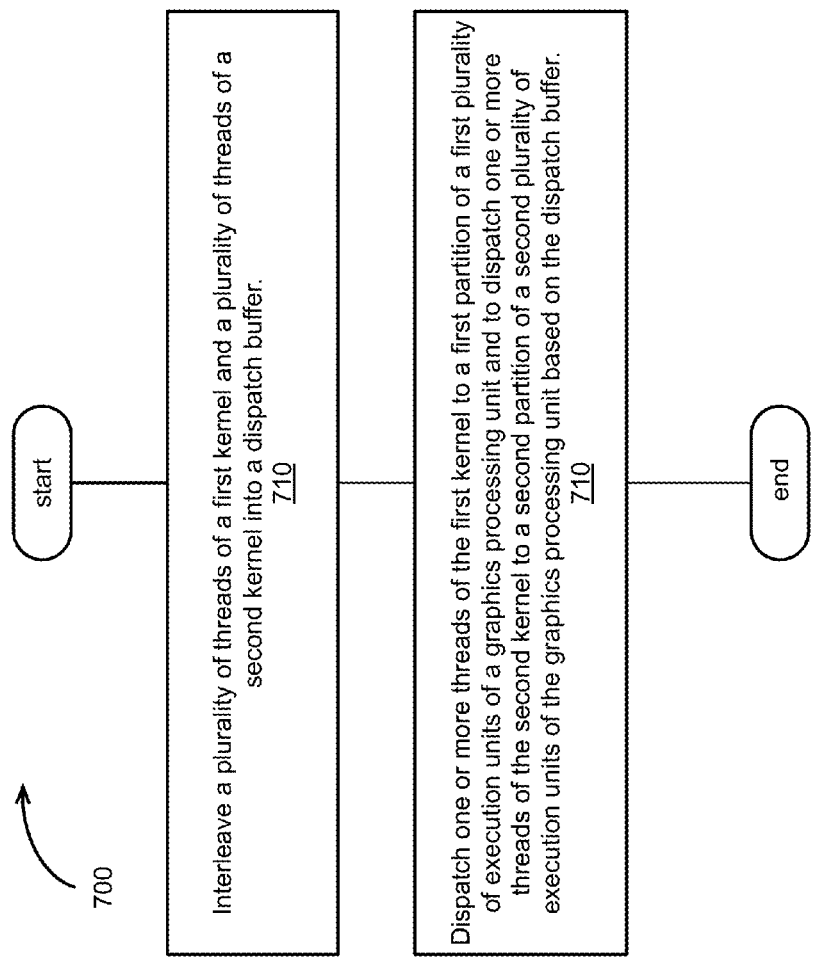
FIG. 7 illustrates a logic flow according to an embodiment.

FIG. 7 illustrates one embodiment of a logic flow 700. The logic flow 700 may be representative of some or all of the operations executed by one or more embodiments described herein. More specifically, the logic flow 700 may illustrate operations performed by the processor component 110 and/or the GPU 120 in executing at least the control routine 132, and/or performed by other component(s) of the computing device 100.

At 710, a processor component of a computing device of a display data processing system (e.g., the processor component 110 of the computing device 100 of the display data processing system 1000) is caused by execution of a kernel interleaver of a GPU driver to interleave a plurality of threads of a first kernel and a plurality of threads of a second kernel into a dispatch buffer.

For example, the kernel interleaver 1323 of the GPU driver 1321 of the control routine 132 may generate the dispatch buffer 230 by interleaving the threads 2201 and 2202 of the kernels 210-1 and 210-2.

At 720, the processor component of the computing device of the display data processing system (e.g., the processor component 110 of the computing device 100 of the display data processing system 1000) is caused by execution of a thread dispatcher of the GPU driver to dispatch one or more threads of the first kernel to a first partition of a first plurality of execution units of a GPU and to dispatch one or more threads of the second kernel to a second partition of a second plurality of execution units of the GPU based on the dispatch buffer.

For example, the thread dispatcher 1324 of the GPU driver 1321 of the control routine 132 may dispatch the threads 2201 and 2202 to the GPU 120 based on an order of execution indicated in the dispatch buffer 230

Figure 8:
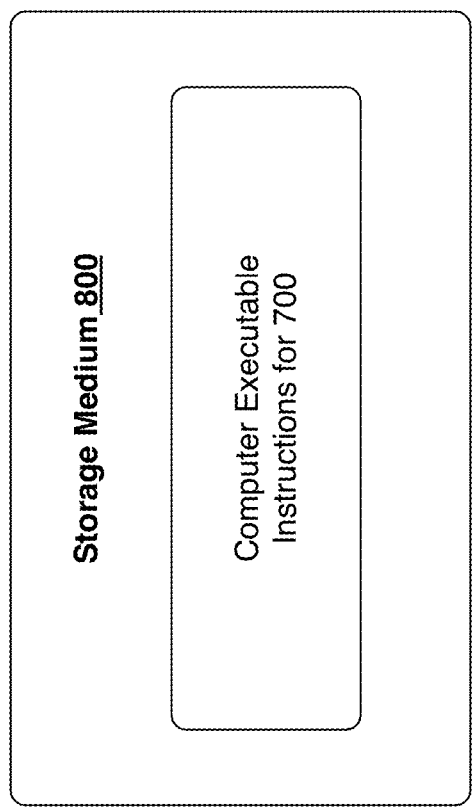
FIG. 8 illustrates a storage medium according to an embodiment.

FIG. 8 illustrates an embodiment of a storage medium 800. The storage medium 800 may comprise an article of manufacture. In some examples, the storage medium 800 may include any non-transitory computer readable medium or machine readable medium, such as an optical, magnetic or semiconductor storage. The storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
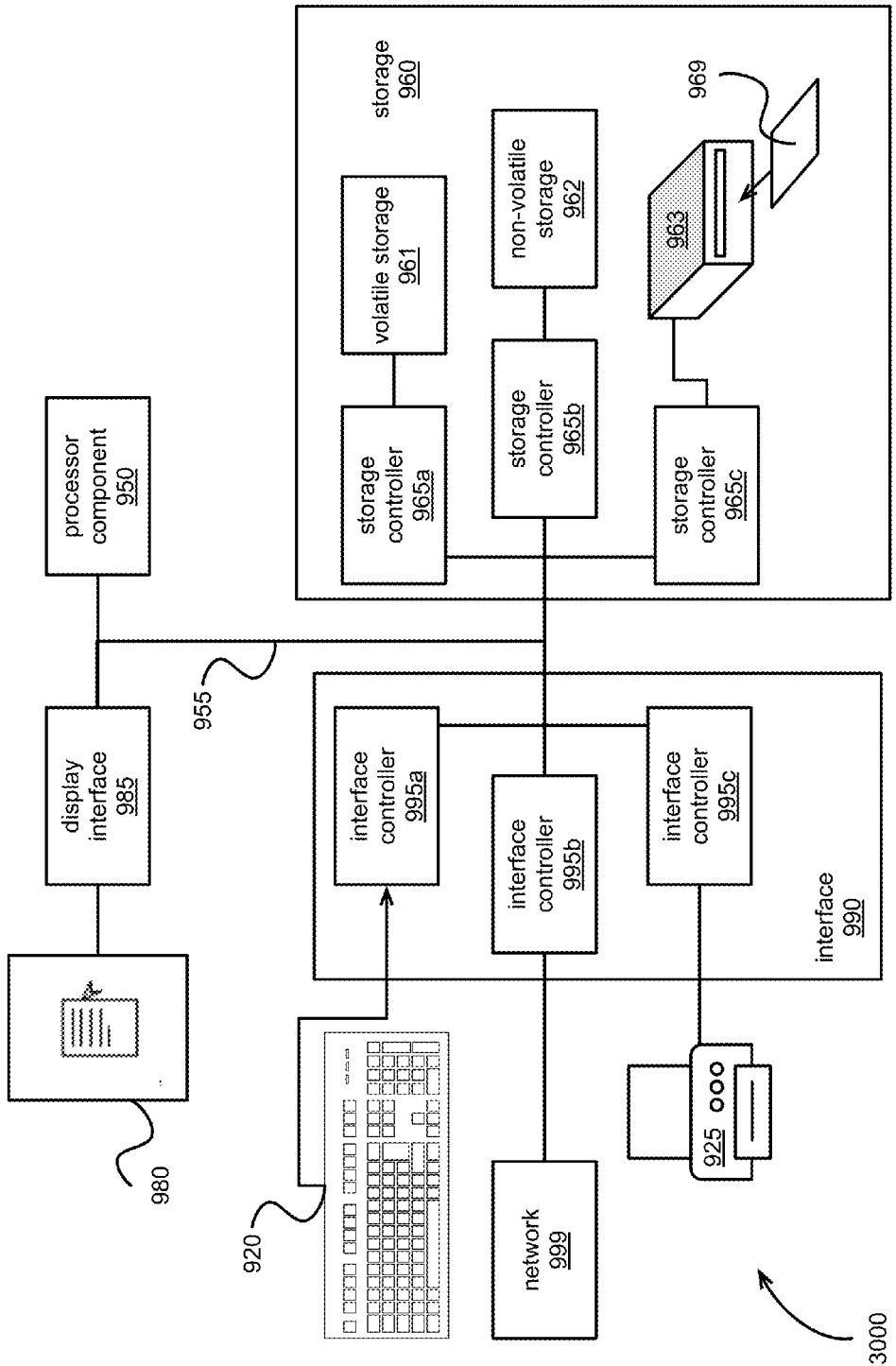
FIG. 9 illustrates a processing architecture according to an embodiment.

FIG. 9 illustrates an embodiment of an exemplary processing architecture 3000 suitable for implementing various embodiments as previously described. More specifically, the processing architecture 3000 (or variants thereof) may be implemented as part of the computing device 100.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 110) may include any of a wide variety of commercially available processors, employing any of a wide variety of technologies and implemented with one or more cores physically combined in any of a number of ways.

As previously discussed, the storage 960 (corresponding to the storage 130) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 160) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network made up of one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, sounds, laser printers, inkjet printers, mechanical robots, milling machines, etc.

Where a computing device is communicatively coupled to (or perhaps, actually incorporates) a display (e.g., the depicted example display 980, corresponding to the display 150), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus. The apparatus including a graphics processing unit having a first partition including a first plurality of execution units and a second partition including a second plurality of execution units, the graphics processing unit to execute a plurality of threads of a first kernel in the first partition and to execute a plurality of threads of a second kernel in the second partition, the plurality of threads of the first kernel and the plurality of threads of the second kernel executed in parallel to increase a utilization of the plurality of execution units.

EXAMPLE 2

The apparatus of example 1, the graphics processing unit to receive an indication of an ordering of execution of the plurality of threads of the first kernel and the plurality of threads of the second kernel.

EXAMPLE 3

The apparatus of example 2, wherein the ordering of execution is based at least in part on one or more of: the number of the plurality of threads of the first kernel, the number of the plurality of threads of the second kernel, the number of the first plurality of execution units, or the number the second plurality of execution units.

EXAMPLE 4

The apparatus of example 3, wherein the ordering of execution is based at least in part on a dependency between the plurality of threads in the first kernel.

EXAMPLE 5

The apparatus of any one of examples 1 to 4, ones of the plurality of threads in the first kernel having dependency upon other ones of the plurality of threads in the first kernel, the ordering of execution indicating that more ones of the plurality of threads of the second kernel are to be executed before more ones of the plurality of threads of the first kernel.

EXAMPLE 6

The apparatus of any one of examples 1 to 5, the graphics processing unit to receive, for each of the plurality of threads of the first kernel and for each of the plurality of threads of the second kernel, an indication that the thread is to be executed in either the first partition or the second partition.

EXAMPLE 7

The apparatus of any one of examples 1 to 6, the first kernel corresponding to a media kernel and the second kernel corresponding to a media kernel.

EXAMPLE 8

The apparatus of any one of examples 1 to 6, the first kernel and the second kernel corresponding to encoded display data.

EXAMPLE 9

The apparatus of example 8, the first kernel and the second kernel being encoded based on an encoding standard selected from the group consisting of WMV, MPEG-4, H.264/MPEG-4, VC1, VP8, or HVEC.

EXAMPLE 10

The apparatus of any one of examples 7 to 9, the first kernel corresponding to luma information of the encoded display data and the second kernel corresponding to chrominance information for the encoded display data.

EXAMPLE 11

The apparatus of any one of examples 1 to 10, further including a display operably coupled to the graphics processing unit to display data processed by the graphics processing unit and a wireless radio operably coupled to the graphics processing unit to receive data to be processed by the graphics processing unit.

EXAMPLE 12

A computing-implemented method for processing display data. The method including interleaving a plurality of threads of a first kernel and a plurality of threads of a second kernel into a dispatch buffer, the dispatch buffer to include an indication of an ordering of execution of the plurality of threads of the first kernel and the plurality of threads of the second kernel and dispatching one or more threads of the first kernel to a first partition including a first plurality of execution units of a graphics processing unit and to dispatch one or more threads of the second kernel to a second partition including a second plurality of execution units of the graphics processing unit based on the dispatch buffer to increase a utilization of the plurality of execution units.

EXAMPLE 13

The computing-implemented method of example 12, dispatching the one or more threads of the first kernel and the one or more threads of the second kernel in parallel.

EXAMPLE 14

The computing-implemented method of any of examples 12 to 13, interleaving a plurality of threads of a first kernel and a plurality of threads of a second kernel into a dispatch buffer including determining an order of interleaving the plurality of threads of the first kernel and the plurality of threads of the second kernel based at least in part on one or more of the number of the plurality of threads of the first kernel, the number of the plurality of threads of the second kernel, the number of the first plurality of execution units, or the number the second plurality of execution units.

EXAMPLE 15

The computing-implemented method of example 14, determining an order of interleaving the plurality of threads of the first kernel and the plurality of threads of the second kernel based at least in part on a dependency between the plurality of threads in the first kernel.

EXAMPLE 16

The computing-implemented method of any one of examples 12 to 15, ones of the plurality of threads in the first kernel having dependency upon other ones of the plurality of threads in the first kernel, determining an order of interleaving the plurality of threads of the first kernel and the plurality of threads of the second kernel including ordering more ones of the plurality of threads of the second kernel at the beginning of the dispatch buffer than ones of the plurality of threads of the first kernel.

EXAMPLE 17

The computing-implemented method of any one of examples 14 to 16, the dispatch buffer to include an indication of a partition of execution units of the graphics processing unit to execute the plurality of threads of the first kernel and the plurality of threads of the second kernel.

EXAMPLE 18

The computing-implemented method of example 17, the indication of a partition of execution units of the graphics processing unit to execute the plurality of threads of the first kernel and the plurality of threads of the second kernel including, for each of the plurality of threads of the first kernel and for each of the plurality of threads of the second kernel an indication that either the first partition or the second partition is to execute the thread.

EXAMPLE 19

The computing-implemented method of any one of examples 12 to 18, the first kernel corresponding to a media kernel and the second kernel corresponding to a media kernel.

EXAMPLE 20

The computing-implemented method of any one of examples 12 to 18, the first kernel and the second kernel corresponding to encoded display data.

EXAMPLE 21

The computing-implemented method of example 20, the first kernel and the second kernel being encoded based on an encoding standard selected from the group consisting of WMV, MPEG-4, H.264/MPEG-4, VC1, VP8, or HVEC.

EXAMPLE 22

The computing-implemented method of any one of examples 20 to 21, the first kernel corresponding to luma information of the encoded display data and the second kernel corresponding to chrominance information for the encoded display data.

EXAMPLE 23

The computing-implemented method of any one of examples 12 to 22, receiving display data and generating the first kernel and the second kernel from the display data.

EXAMPLE 24

An apparatus comprising means for performing the method of any of examples 12-23.

EXAMPLE 25

At least one machine-readable storage medium. The at least one machine-readable storage medium including instructions that when executed by a computing device, cause the computing device to interleave a plurality of threads of a first kernel and a plurality of threads of a second kernel into a dispatch buffer, the dispatch buffer to include an indication of an ordering of execution of the plurality of threads of the first kernel and the plurality of threads of the second kernel.

EXAMPLE 26

The at least one machine-readable storage medium of example 25, further including instructions that when executed by a computing device, cause the computing device to dispatch in parallel one or more threads of the first kernel to a first partition including a first plurality of execution units of a graphics processing unit and to dispatch one or more threads of the second kernel to a second partition including a second plurality of execution units of the graphics processing unit based on the dispatch buffer to increase a utilization of the plurality of execution units.

EXAMPLE 27

The at least one machine-readable storage medium of any one of examples 25 to 26, interleaving a plurality of threads of a first kernel and a plurality of threads of a second kernel into a dispatch buffer including determining an order of interleaving the plurality of threads of the first kernel and the plurality of threads of the second kernel based at least in part on one or more of the number of the plurality of threads of the first kernel, the number of the plurality of threads of the second kernel, the number of the first plurality of execution units, or the number the second plurality of execution units.

EXAMPLE 28

The at least one machine-readable storage medium of example 27, determining an order of interleaving the plurality of threads of the first kernel and the plurality of threads of the second kernel based at least in part on a dependency between the plurality of threads in the first kernel.

EXAMPLE 29

The at least one machine-readable storage medium of any one of examples 27 to 28, ones of the plurality of threads in the first kernel having dependency upon other ones of the plurality of threads in the first kernel, determining an order of interleaving the plurality of threads of the first kernel and the plurality of threads of the second kernel including ordering more ones of the plurality of threads of the second kernel at the beginning of the dispatch buffer than ones of the plurality of threads of the first kernel.

EXAMPLE 30

The at least one machine-readable storage medium of any one of examples 27 to 29, the dispatch buffer to include an indication of a partition of execution units of the graphics processing unit to execute the plurality of threads of the first kernel and the plurality of threads of the second kernel.

EXAMPLE 31

The at least one machine-readable storage medium of example 30, the indication of a partition of execution units of the graphics processing unit to execute the plurality of threads of the first kernel and the plurality of threads of the second kernel including, for each of the plurality of threads of the first kernel and for each of the plurality of threads of the second kernel an indication that either the first partition or the second partition is to execute the thread.

EXAMPLE 32

The at least one machine-readable storage medium of any one of examples 25 to 31, the first kernel corresponding to a media kernel and the second kernel corresponding to a media kernel.

EXAMPLE 33

The at least one machine-readable storage medium of any one of examples 25 to 31, the first kernel and the second kernel corresponding to encoded display data.

EXAMPLE 34

The at least one machine-readable storage medium of example 33, the first kernel and the second kernel being encoded based on an encoding standard selected from the group consisting of WMV, MPEG-4, H.264/MPEG-4, VC1, VP8, or HVEC.

EXAMPLE 35

The at least one machine-readable storage medium of any one of examples 33 to 34, the first kernel corresponding to luma information of the encoded display data and the second kernel corresponding to chrominance information for the encoded display data.

EXAMPLE 36

The at least one machine-readable storage medium of any one of examples 25 to 35, receiving display data and generating the first kernel and the second kernel from the display data.

What is claimed is:

1. An apparatus comprising:
a graphics processing unit having a first partition including a first plurality of execution units and a second partition including a second plurality of execution units, the graphics processing unit to execute a plurality of threads of a first kernel in the first partition and to execute a plurality of threads of a second kernel in the second partition, the plurality of threads of the first kernel and the plurality of threads of the second kernel executed in parallel and in accordance with an ordering of execution of the plurality of threads of the first kernel and the plurality of threads of the second kernel, the ordering of execution based at least in part on a dependency between the plurality of threads in the first kernel and the ordering of execution to indicate that more ones of the plurality of threads in the second kernel are to be executed before more ones of the plurality of threads in the first kernel.

2. The apparatus of claim 1, the graphics processing unit to receive an indication of the ordering of execution of the plurality of threads of the first kernel and the plurality of threads of the second kernel.

3. The apparatus of claim 2, the ordering of execution based at least in part on one or more of: the number of the plurality of threads of the first kernel, the number of the plurality of threads of the second kernel, the number of the first plurality of execution units, or the number of the second plurality of execution units.

4. The apparatus of claim 1, the graphics processing unit to receive, for each of the plurality of threads of the first kernel and for each of the plurality of threads of the second kernel, an indication that the thread is to be executed in either the first partition or the second partition.

5. The apparatus of claim 1, the first kernel corresponding to a media kernel and the second kernel corresponding to a media kernel.

6. The apparatus of claim 1, the first kernel and the second kernel corresponding to encoded display data, the encoded display data encoded based on an encoding standard selected from the group consisting of WMV, MPEG-4, H.264/MPEG-4, VC1, VP8, or HVEC.

7. The apparatus of claim 6, the first kernel corresponding to luma information of the encoded display data and the second kernel corresponding to chrominance information for the encoded display data.

8. The apparatus of claim 1, further comprising:
a display operably coupled to the graphics processing unit to display data processed by the graphics processing unit; and
a wireless radio operably coupled to the graphics processing unit to receive data to be processed by the graphics processing unit.

9. A computing-implemented method for processing display data comprising:
determining an order of interleaving a plurality of threads of a first kernel and a plurality of threads of a second kernel into a dispatch buffer based at least in part on a dependency between the plurality of threads in the first kernel, the order of interleaving including ordering more ones of the plurality of threads of the second kernel at the beginning of the dispatch buffer than ones of the plurality of threads of the first kernel
interleaving the plurality of threads of the first kernel and the plurality of threads of the second kernel into the dispatch buffer, the dispatch buffer to include an indication of an ordering of execution of the plurality of threads of the first kernel and the plurality of threads of the second kernel; and
dispatching one or more threads of the first kernel to a first partition including a first plurality of execution units of a graphics processing unit and to dispatch one or more threads of the second kernel to a second partition including a second plurality of execution units of the graphics processing unit based on the dispatch buffer.

10. The computing-implemented method of claim 9, dispatching the one or more threads of the first kernel and the one or more threads of the second kernel in parallel.

11. The computing-implemented method of claim 10, determining the order of interleaving the plurality of threads of the first kernel and the plurality of threads of the second kernel based at least in part on one or more of the number of the plurality of threads of the first kernel, the number of the plurality of threads of the second kernel, the number of the first plurality of execution units, or the number of the second plurality of execution units.

12. The computing-implemented method of claim 9, the dispatch buffer to include an indication of a partition of execution units of the graphics processing unit to execute the plurality of threads of the first kernel and the plurality of threads of the second kernel.

13. The computing-implemented method of claim 12, the first kernel and the second kernel corresponding to encoded display data, the encoded display data encoded based on an encoding standard selected from the group consisting of WMV, MPEG-4, H.264/MPEG-4, VC1, VP8, or HVEC.

14. The computing-implemented method of claim 13, the first kernel corresponding to luma information of the encoded display data and the second kernel corresponding to chrominance information for the encoded display data.

15. At least one non-transitory machine-readable storage medium comprising instructions that when executed by a computing device, cause the computing device to:
   determine an order of interleaving a plurality of threads of a first kernel and a plurality of threads of a second kernel into a dispatch buffer, the determination based at least in part on a dependency between the plurality of threads in the first kernel, the order of interleaving to include ordering more ones of the plurality of threads of the second kernel at the beginning of the dispatch buffer than ones of the plurality of threads of the first kernel
   interleave the plurality of threads of the first kernel and the plurality of threads of the second kernel into the dispatch buffer, the dispatch buffer to include an indication of an ordering of execution of the plurality of threads of the first kernel and the plurality of threads of the second kernel.

16. The at least one non-transitory machine-readable storage medium of claim 15, further comprising instructions that when executed by the computing device, cause the computing device to:
   dispatch in parallel one or more threads of the first kernel to a first partition including a first plurality of execution units of a graphics processing unit and to dispatch one or more threads of the second kernel to a second partition including a second plurality of execution units of the graphics processing unit based on the dispatch buffer.

17. The at least one non-transitory machine-readable storage medium of claim 16, the order of interleaving the plurality of threads of the first kernel and the plurality of threads of the second kernel based at least in part on one or more of the number of the plurality of threads of the first kernel, the number of the plurality of threads of the second kernel, the number of the first plurality of execution units, or the number the second plurality of execution units.

18. The at least one non-transitory machine-readable storage medium of claim 15, the dispatch buffer to include an indication of a partition of execution units of the graphics processing unit to execute the plurality of threads of the first kernel and the plurality of threads of the second kernel.

19. The at least one non-transitory machine-readable storage medium of claim 18, the indication of a partition of execution units of the graphics processing unit to execute the plurality of threads of the first kernel and the plurality of threads of the second kernel including, for each of the plurality of threads of the first kernel and for each of the plurality of threads of the second kernel an indication that either the first partition or the second partition is to execute the thread.

* * * * *